United States Patent [19]

Singer

[11] 3,855,278

[45] Dec. 17, 1974

[54] POLYBASIC UNSATURATED CARBOXYLIC ACID ESTERS

[75] Inventor: Helmut Singer, Dusseldorf-Wersten, Germany

[73] Assignee: Henkel and Cie GmbH, Dusseldorf-Holthausen, Germany

[22] Filed: Aug. 7, 1972

[21] Appl. No.: 278,564

[30] Foreign Application Priority Data
Aug. 25, 1971  Germany.............................. 2142444

[52] U.S. Cl.......... 260/485 R, 106/252, 260/537 R, 260/537 N
[51] Int. Cl........................ C07c 69/52, C07c 69/60
[58] Field of Search..................... 260/485 R, 537 N

[56] References Cited
UNITED STATES PATENTS

| | | | |
|---|---|---|---|
| 3,493,590 | 2/1970 | Chabardes | 260/410.9 R |
| 3,660,440 | 5/1972 | Wilke et al. | 260/410.9 R |

Primary Examiner—James A. Patten
Assistant Examiner—E. Jane Skelly
Attorney, Agent, or Firm—Hammond & Littell

[57] ABSTRACT

A process for producing higher polybasic and polyunsaturated carboxylic acid esters comprising reacting a conjugated diolefin with a carboxylic acid ester in the presence of an organometallic catalyst complex comprising zero valent nickel and an electron donor.

A higher polybasic polyunsaturated carboxylic acid or ester thereof has at least 13 carbon atoms.

7 Claims, No Drawings

POLYBASIC UNSATURATED CARBOXYLIC ACID ESTERS

THE PRIOR ART

Diolefins with conjugated double bonds are known to be able to react with mono-olefinic compounds in the presence of organometal complexes of the iron group and possibly of a substance serving as electron donor, with formation of cooligomers. Suitable catalysts are the zero-valent complexes of iron, cobalt and nickel, which are added to the reaction mixture either in isolated form or are formed in situ by the reaction of suitable salts of the said metals with organo-metal compounds or hydrides in the presence of electron donors or of substances which form structures with isolated pairs of electrons and in this form may act as electron donors.

Electron donors which may be used include tertiary amines, alkylphosphines and arylphosphines, alkylarsines and arylarsines and alkylstibines and arylstibines, phosphine oxides, esters of phosphorous and thiophosphorous acids, triamides of phosphorous acid, ethers, thioethers, sulfoxides, sulfones, and also olefins, especially polyolefins, as well as acetylenic compounds and especially the dienes to be reacted in the cooligomerization process. By the reaction of acrylic acid or methacrylic acid esters with conjugated dienes, polyunsaturated carboxylic acid esters of different chain length, which may differ by the number, or a multiple of the number, of carbon atoms in the conjugated diene, are obtained according to the reaction conditions and molar ratio of the reaction mixture, which may then be converted in the usual way into free carboxylic acids. Compounds which are obtained in this way using acrylic acid derivatives as starting substances and which have been described in the literature, are for example, heptadienoic acid, undecatrienoic acid, and esters thereof, as well as undecatriene-carboxylic acid and nonadecapentaene-carboxylic acid or their esters when methacrylic acid is used as the starting substance.

OBJECTS OF THE INVENTION

It is an object of the present invention to provide a process for the preparation of higher, polybasic and polyunsaturated carboxylic acid esters, which comprises reacting a conjugated diolefin of 4 to 10 carbon atoms with a carboxylic acid ester of the formula:

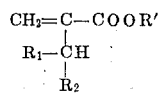

in which $R_2$ is $-(CH_2)_n-COOR''$, in which $n$ is 0 or 1, $R_1$ is selected from the group consisting of hydrogen and $R_2$ and $R'$ and $R''$ are each the alkyl of 1 to 12 carbon atoms in a ratio of at least 2 mols of diolefin per mol of carboxylic acid ester in the presence of an organometal catalyst complex comprising zero-valent nickel and an electron donor selected from the group consisting of phosphorous acid triamides, heterocyclic N-bases, aliphatic amines, aromatic amines, nitriles, and triarly phosphines, triaryl arsines, and triaryl stibines in the ratio of about 1 mol of electron donor per gram-atom of nickel; and recovering the said carboxylic acid ester.

It is another object of the present invention to provide a higher polybasic polyunsaturated carboxylic acid or ester of the formula

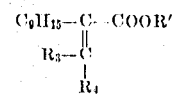

in which $R_4$ is $-(CH_2)_n-COOR''$, $R_3$ is selected from the group consisting of hydrogen and $R_4$, $n$ is 0 or 1, and $R'$ and $R''$ are each selected from the group consisting of hydrogen and alkyl of 1 to 12 carbon atoms.

These and other objects of the invention will become apparent as the description thereof proceeds.

DESCRIPTION OF THE INVENTION

It has been found that by using special unsaturated di- and tri-carboxylic acid ester reactants and by specified control of the process, that higher polybasic and polyunsaturated carboxylic acids or their esters are obtainable by co-oligomerization reactions.

The present invention provides a process for the preparation of higher, polybasic and polyunsaturated carboxylic acid esters, which comprises reacting a conjugated diolefin of 4 to 10 carbon atoms with a carboxylic acid ester of the formula:

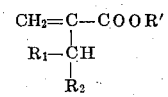

in which $R_2$ is $-(CH_2)_n-COOR''$, in which $n$ is 0 or 1, $R_1$ is selected from the group consisting of hydrogen and $R_2$ and $R'$ and $R''$ are each the alkyl of 1 to 12 carbon atoms, in a ratio of at least 2 mols of diolefin per mol of carboxylic acid ester in the presence of an organometal catalyst complex comprising zero-valent nickel and an electron donor selected from the group consisting of phosphorous acid triamides, heterocyclic N-bases, aliphatic amines, aromatic amines, nitriles, and triaryl phosphines, triaryl arsines and triaryl stibines in the ratio of about 1 mol of electron donor per gram-atom of nickel; and recovering the said carboxylic acid ester; and, if desired converting them into the free carboxylic acids by saponification.

The present invention further provides a higher polybasic polyunsaturated carboxylic acid or ester of the formula

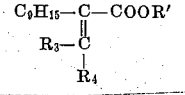

in which $R_4$ is $-(CH_2)_n-COOR''$, $R_3$ is selected from the group consisting of hydrogen and $R_4$, $n$ is 0 or 1, and $R'$ and $R''$ are each selected from the group consisting of hydrogen and alkyl of 1 to 12 carbon atoms.

Suitable starting materials of the above formula are esters of carboxylic acids such as an ester of itaconic acid; or esters such as dimeric acrylates, mixed dimers from acrylate and fumarate or maleate.

Preferred esters of the said acids are carboxylic acid ester of alkanols of 1 to 12 carbon atoms, such as, for example, with normal, secondary or tertiary butanol or relatively long-chain, straight chain and branched chain alkanols of 1 to 12 carbon atoms. The use of the methyl esters, i.e., the above-mentioned residue R' or R'' is $CH_3$, is especially preferable when the esters prepared in the process according to the invention are subsequently to be saponified to the corresponding acids.

The following are examples of substances of the said classes which can be used as electron donors according to the invention: phosphorous acid triamides such as phosphorous acid trimorpholide, phosphorous acid-tri-N-methylanilide, tri-N,N-dialkylamides of phosphorous acid; aliphatic amines which may be primary, secondary or tertiary such as hexylamine, dibutylamine, triethylamine; heterocyclic N-bases such as morpholine, N-methylmorpholine, piperidine, pyridine, picoline, collidine, quinoline, pyrrole; aromatic amines which may be primary, secondary or tertiary such as diphenylamine, triphenylamine, benzylamine, dimethylaniline, toluidine; nitriles such as acetonitrile and benzonitrile; triarylphosphines, triaryl arsines and triaryl stibines, such as triphenylphosphine, tritolylphosphine, triphenyl arsine, trinaphthyl arsine, tri-o-tolylarsine, triphenyl stibine, trinaphthyl stibine and tri-o-tolylstibine.

Electron donors from the group consisting of heterocyclic N-bases, aliphatic amines, aromatic amines, triaryl arsines and triaryl stibines are preferred.

For the preparation of the active catalyst solution the said electron donors are used in amounts of about 1 mol per gram-atom of nickel.

The preparation of the organometal complex of the zero-valent nickel may be carried out in the usual way. Any desired nickel salts or nickel complex may be used, since during the subsequent reduction, insoluble salts also go gradually into solution in the system and give an active catalyst solution. For the preparation of the catalyst solutions, however, anhydrous organic nickel salts of aliphatic or aromatic carboxylic acids as for example, nickel laurate, nickel palmitate or nickel benzoate, chelate complexes such as nickel-(II)-acetyl acetonate or nickel salicylate are preferred.

For the reduction of the nickel compounds, hydrides and organometal derivatives of the elements of the Ia, IIa, IIb and IIIa groups of the periodic system are chiefly used, for example those of lithium, sodium, potassium, magnesium, calcium, zinc, boron and aluminium. Specially suitable reducing agents are those of the said types which allow operation in the homogeneous phase, as for example, trialkylaluminium compounds, dialkylaluminium hydrides and alkyllithium compounds. Preferably the alkyl has 1 to 5 carbon atoms.

The relative proportions of the nickel compound to be reduced as the reducing agent is advantageously chosen so that the oxidation equivalent to the reduction equivalent is as 1:0.5 to 1:10.

The active catalyst complex with zero-valent nickel, as is generally usual in practice, may advantageously be prepared in the mass of the compounds to be reacted itself. For example, a nickel compound, in which nickel is present in a usual valency stage, the electron donor and a part of the diene to be reacted are introduced in a solvent and then the reducing agent is added.

Solvents suitable for this reducing process and the subsequent co-oligomerization reaction are those which are inert under the operating conditions, for example saturated aliphatic hydrocarbons having 5 to 10 carbon atoms such as hexane, heptane or octane; saturated cycloaliphatic hydrocarbons, such as cyclohexane; or aromatic hydrocarbons, such as benzene or toluene; alkylethers such as diethyl ether or diisopropyl ether; and non-reactive cyclic ethers such as tetrahydrofuran or dioxane, as well as halogenated hydrocarbons, for example methylene chloride or chlorobenzene.

The ratio of catalyst and the carboxylic acid esters to be reacted is advantageously selected so that 50 to 200 mols of carboxylic acid ester are used to 1 gram-atom of zero-valent nickel, i.e. the concentration of catalyst, referred to the sum of the monomers used, amounts to less than 4%. Obviously other amounts of catalyst also come within the scope of the invention, but are not preferred because of economic reasons, as well as due to the catalyst preparation required, and partly due to the slow course of the reaction.

Virtually all conjugated olefinic dienes may be used as the olefinic starting materials, preferably those dienes having from 4 to 10 carbon atoms, and in particular butadiene-1,3 and its methyl substitution products such as isoprene, 2,3-dimethylbutadiene and pentadiene-1,3. These are all alkadienes having from 4 to 10 carbon atoms.

The process according to the invention may be carried out continuously or discontinuously. The reaction takes place at temperatures between 20° and 150°C, preferably between 60° and 120°C, under normal or increased pressure. The pressure may range from 1 to 4 atmospheres absolute.

It is advisable to carry out the reaction in a protective gas, such as is also suitable in the preparation of the active catalyst solution, and to maintain this atmosphere of protective gas up to the working up of the reaction solution.

The proportion of diolefin and carboxylic acid ester is preferably selected so that a small excess of diolefin over the stoichiometric amount necessary of 2 mols of diolefin per mol of carboxylic acid ester is present. This excess should amount to about 5% to 10% of the amount of diolefin theoretically required.

The separation of the products from the reaction mixture may be effected in the usual way, for example by fractional distillation. Before the distillation the active catalyst is suitably destroyed by introduction of air into the reaction mixture or by addition of alcohol or acid.

The optional step of saphonifying the ester obtained may be effected in the usual way, advantageously with an approximately 10% excess of the stoichiometrically required amount of alkali metal hydroxide in aqueous-alcoholic solution.

The products of the process are novel higher polybasic polyunsaturated carboxylic acids or esters of the formula $$C_9H_{15}-C-COOR'$$
$$R_3-C$$
$$R_4$$

in which $R_4$ is $-(CH_2)_n-COOR''$, $R_3$ is selected from the group consisting of hydrogen and $R_4$, n is 0 or 1, and $R'$ and $R''$ are each selected from the group consisting of hydrogen and alkyl of 1 to 12 carbon atoms.

Compounds in which $R_3$ is hydrogen and $R'$ and $R''$ are hydrogen or methyl are preferred.

The new esters and acids preparable by the process according to the invention are valuable intermediate products for organic synthesis. They may be converted by hydrogenation into the corresponding saturated esters and acids, and polyfunctional substances which are valuable as raw materials for polycondensation reactions, may be obtained by oxidative fission or hydroxylation of the double bonds. In addition, in analogy with drying oils, they may be used in corresponding paints.

The present invention will be further illustrated by reference to the following examples which are not to be deemed limitative in any manner thereof.

EXAMPLE 1

2.8 gm (10.9 m mol) of dry nickel-(II)-acetylacetonate were dissolved in 100 ml of benzene in an atmosphere of nitrogen and 0.9 ml (11 m mol) of pyridine and about 10 gm of butadiene were added. Then 3 ml (22 m mol) of triethylaluminium were slowly added dropwise into the reaction mixture. 86 gm (545 m mol) of dimethyl itaconate were added to the red catalyst solution and the reaction solution was then sucked into an autoclave under vacuum. 60 gm of butadiene were added to the reaction mixture under a gauge pressure of about 3 atmosphere (or 4 atm. absolute) and the contents of the autoclave were heated at 80°C while stirring for 4 hours. Air was passed into the resulting reaction mixture until the latter was decolorized and it was then distilled. The fraction passing over at about 125° to 130°C under a pressure of about 0.1 mm Hg was collected. It was amounted to 85 gm and consisted of 91% of a $C_{13}$-diester mixture. The yield, based on dimethyl itaconate used, was therefore 53.5%. The $C_{13}$-diester obtained had a boiling point of 122°C at 0.1 mm Hg after redistillation.

Index of refraction, $n_D^{20} = 1.4820$.

Infra-red: 1,727 cm$^{-1}$, 1,640–1,655 cm$^{-1}$, 998 and 913 cm$^{-1}$ (vinyl), 972 cm$^{-1}$ (trans C=C), 1,026 cm$^{-1}$ (C=C conjugated).

20 g of the diester were boiled under reflux for 4 hours with a solution of 9 g of KOH. The free acid separated by acidifying the saponification solution, after recrystallization from benzene/petroleum ether, had a melting point of 128° to 131°C.

Acid value: 464.5

Infra-red: 1,720–1,690 cm$^{-1}$, 1,640–1,650 cm$^{-1}$, 963 cm$^{-1}$, 906 cm$^{-1}$.

EXAMPLES 2 to 5

Utilizing a procedure analogous to Example 1, dimethyl itaconate and butadiene were reacted in the presence of the following electron donors at the said reaction temperatures.

| Example No. | Ligand | Reaction temperature (°C) | Reaction time (h) | % $C_{13}$-diester(x) |
|---|---|---|---|---|
| 2 | triphenylstibine | 80 | 4 | 69 |
| 3 | do. | 50 | 8 | 33 |
| 4 | triphenylarsine | 80 | 2.5 | 58 |
| 5 | triphenylphosphine | 80 | 4 | 22 |

(x) Referred to dimethyl itaconate

EXAMPLE 6

Utilizing a procedure analogous to Example 1 and with the same molar proportions, 2-vinylidene-pentane-diaciddimethyl ester (dimeric acrylate) was reacted with butadiene at 80°C with addition of triphenylstibine for 4 hours. After working up, a $C_{14}$-diester resulted in a yield of 89%, referred to dimeric acrylate used.

Boiling point (redistilled) 130° to 135°C at 0.1 mm Hg.

Infra-red: 1,748 cm$^{-1}$, 1,723 cm$^{-1}$, 1,640-1660 cm$^{-1}$, 992 and 908 cm$^{-1}$, 967 cm$^{-1}$, 1,010 cm$^{-1}$.

The free acid product obtained in a manner similar to that in Example 1 had a boiling point of 180° to 185°C at 0.1 mm Hg. Infra-red: 1,755 cm$^{-1}$, 1,715 cm$^{-1}$, 1,640 cm$^{-1}$, 968 cm$^{-1}$, 910 cm$^{-1}$.

EXAMPLE 7

Example 6 was repeated with the exception that morpholine was used instead of triphenylstibine in the same molar amount. The yield of $C_{14}$-diester was 34%.

EXAMPLE 8

Example 6 was repeated with the exception that, instead of triphenylphosphine, pyridine was used in the same molar amount. The yield of $C_{14}$-diester was 78%.

EXAMPLE 9

Utilizing a procedure analogous to Example 1, and with the same molar proportions, butene-(3)-tricarboxylic acid-(1,2,3)-trimethyl ester (mixed fumarate-acrylate dimer) was reacted with butadiene at 120°C for 4 hours with the addition of triphenylstibine. A $C_{15}$-triester resulted in a yield of 31%, referred to fumarate-acrylate dimer used.

Although the present invention has been disclosed in connection with a few preferred embodiments thereof, variations and modifications may be resorted to those skilled in the art without departing from the principles of the new invention. All of these variations and modifications are considered to be within the true spirit and scope of the present invention as disclosed in the foregoing description and defined by the appended claims.

I claim:

1. A higher polybasic polyunsaturated carboxylic acid ester of the formula

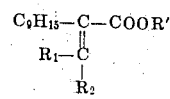

in which $R_2$ is —$(CH_2)_n$—COOR'', $R_1$ is selected from the group consisting of hydrogen and $R_2$, $n$ is 0 or 1, and R' and R'' are each alkyl of 1 to 12 carbon atoms, produced by reacting butadiene with a carboxylic acid ester of the formula

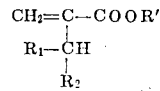

in which $R_1$, $R_2$, R', R'' and n have the same meanings as defined above, in a ratio of at least 2 mols of butadiene per mol of carboxylic acid ester in the presence of an organometal catalyst complex comprising zero-valent nickel and an electron donor selected from the group consisting of phosphorous acid trimorpholide, phosphorous acid-tri-N-methylanilide, tri-N,N-dialkylamides of phosphorous acid, hexylamine, dibutylamine, triethylamine, morpholine, N-methylmorpholine, piperidine, pyridine, picoline, collidine, quinoline, pyrrole, diphenylamine, triphenylamine, benzylamine, dimethylaniline, toluidine, acetonitrile, benzonitrile, triphenylphosphine, tritolyphosphine, triphenyl arsine, trinaphthyl arsine, tri-o-tolylarsine, triphenyl stibine, trinaphthyl stibine, and tri-o-tolylstibine, in the ratio of about 1 mol of electron donor per gram-atom of nickel; and recovering the said carboxylic acid ester.

2. The ester as claimed in claim 1 in which said carboxylic acid ester is an ester of an α-substituted acrylic acid selected from the group consisting of an ester of itaconic acid, a dimeric acrylate, or a mixed dimer from acrylate and fumarate or maleate with an alkanol of 1 to 4 carbon atoms.

3. The ester as claimed in claim 2 in which the ester is a methyl ester.

4. The ester of claim 1, in which $R_1$ is hydrogen.

5. The ester of claim 1, in which R' and R'' are each methyl.

6. A higher polybasic polyunsaturated carboxylic acid of the formula

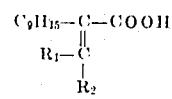

in which $R_2$ is —$(CH_2)_n$—COOH, $R_1$ is selected from the group consisting of hydrogen and $R_2$, $n$ is 0 or 1, produced by reacting butadiene with a carboxylic acid ester of the formula

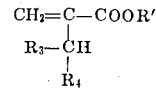

in which $R_4$ is —$(CH_2)_n$—COOR'', in which $n$ is 0 or 1, $R_3$ is selected from the group consisting of hydrogen and $R_4$ and R' and R'' are each the alkyl of 1 to 12 carbon atoms, in a ratio of at least 2 mols of butadiene per mol of carboxylic acid ester in the presence of an organometal catalyst complex comprising zero-valent nickel and an electron donor selected from the group consisting of phosphorous acid trimorpholide, phosphorous acid-tri-N-methylanilide, tri-N,N-dialkylamides of phosphorous acid, hexylamine, dibutylamine, triethylamine, morpholine, N-methylmorpholine, piperidine, pyridine, picoline, collidine, quinoline, pyrrole, diphenylamine, triphenylamine, benzylamine, dimethylaniline, toluidine, acetonitrile, benzonitrile, triphenylphosphine, tritolyphosphine, triphenyl arsine, trinaphthyl arsine, tri-o-tolylarsine, triphenyl stibine, trinaphthyl stibine, and tri-o-tolylstibine, in the ratio of about 1 mol of electron donor per gram-atom of nickel to produce a higher polybasic polyunsaturated ccarboxylic acid ester; converting said ester into the free carboxylic acid by saponification; and recovering the said free carboxylic acid.

7. The acid of claim 6, in which $R_1$ is hydrogen.

* * * * *